D. CUSHMAN.
Water-Wheel.

No. 8,049. Reissued Jan. 22, 1878.

WITNESSES:

Robt. F. Gaylord

Michael P. Dosley

INVENTOR:

D. Cushman

By W. E. Simonds

Atty

N. PETERS, PHOTO-LITHOGRAPHER, WASHINGTON, D. C.

UNITED STATES PATENT OFFICE.

DWIGHT CUSHMAN, OF HARTFORD, CONNECTICUT.

IMPROVEMENT IN WATER-WHEELS.

Specification forming part of Letters Patent No. 106,787, dated August 30, 1870; Reissue No. 8,049, dated January 22, 1878; application filed December 24, 1877.

*To all whom it may concern:*

Be it known that I, DWIGHT CUSHMAN, of Hartford, in the county of Hartford and State of Connecticut, have invented certain new and useful Improvements pertaining to Water-Wheels, of which the following is a specification, reference being had to the accompanying drawings, where—

Figure 2:
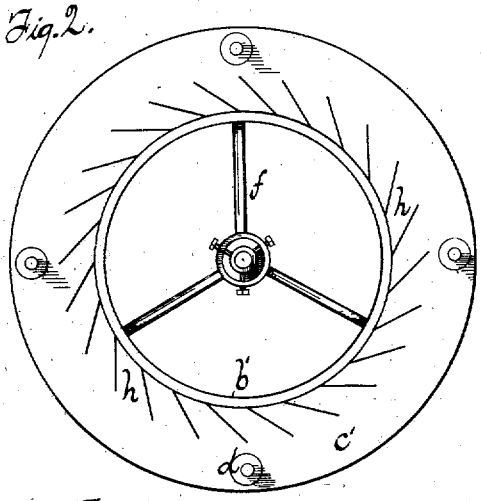
Figure 3:
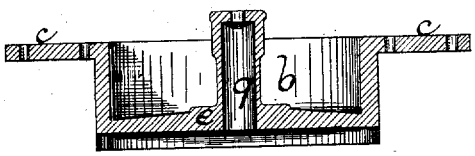
Figure 4:
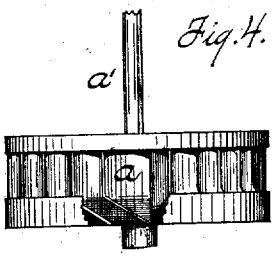
Figure 1:
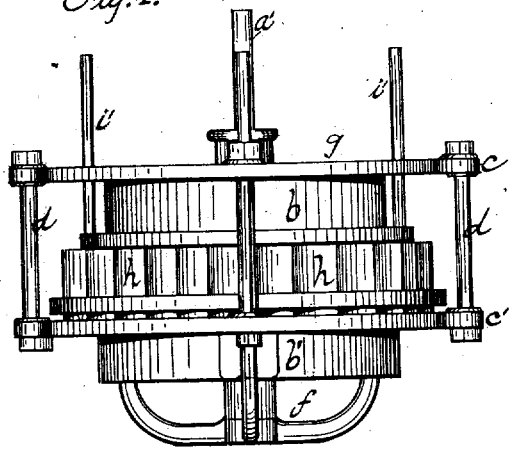
Figure 6:
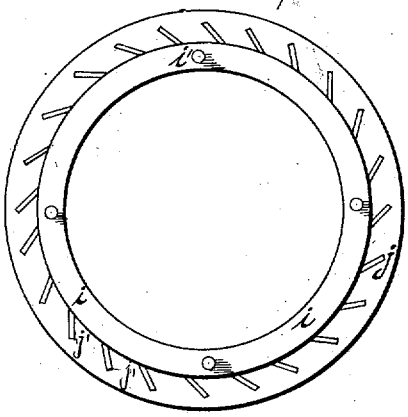
Figure 5:
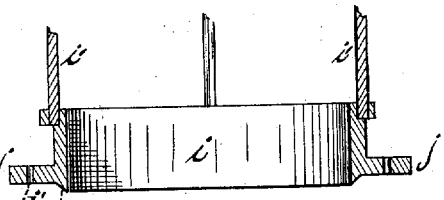

Figure 1 is a side view or elevation of a wheel and gate embodying my said invention. The wheel is of the kind called "turbine." It is inside the casing, and is not seen in this figure. Fig. 2 is a plan view of that part of the casing which is mainly below the gate-opening. This view shows the water-guide plates. Fig. 3 is a view in central vertical section of that part of the casing which is mainly above the gate-opening. Fig. 4 is a side view of the wheel with a part broken out. Fig. 5 is a top view of the gate. Fig. 6 is a view of the gate in central vertical section.

The letter *a* denotes the wheel. *b* and *b'* denote peripheral bands, forming the main part of the wheel-case. The interval between these bands forms the gate-opening. They are, respectively, provided with the flanges *c* and *c'*, which are connected by the pillars *d*. These flanges and pillars permit the gate-opening to be continuous. The casing part *b* is closed over the top of the wheel by the top plate *e*. The wheel-shaft *a'* has a bearing at its lower end, at the center of the spider-arms *f*, and runs out at the top of the wheel-case through the box *g*.

The letters *h* denote water-guide plates, set all around the outside of the wheel, which guide the inflowing current of water to and against the wheel-buckets. These guide-plates rest on and are attached to the flange *c'*.

The letter *i* denotes a peripheral annular gate, which, moved over the gate-opening, as seen in Fig. 1, shuts the water off from the wheel. When moved off from the gate-opening it permits access of water to the wheel. It is operated by means of the gate-rods *i'* and common appliances above. To this gate is attached the laterally-extending annular flange *j*, pierced by slots or mortises $j^1$, for the passage of the guides *h*.

The flange *j* is beveled on its under surface, as seen in Fig. 5. This bevel $j^2$ serves two purposes, to wit: First, in the closing of the gate *j*, it has a tendency to push outward and remove any obstruction which may have gotten in its path; and, second, a small obstruction lying on the flange *c'* does not prevent the gate from closing.

I claim as my invention—

1. In combination with a water-wheel, the water-guide plates and the wheel-gate, provided with the flange mortised for the passage of the water-guide plates, all substantially as shown and described.

2. In combination with a water-wheel, the gate *i*, the flange *c' j*, and the beveled surface $j^2$, all substantially as shown and described.

DWIGHT CUSHMAN.

Witnesses:

W. E. SIMONDS,
ROBT. F. GAYLORD.